March 26, 1968     S. A. STUBBLEFIELD     3,375,490

FLEXIBLE CABLELIKE TRANSDUCER

Filed Nov. 17, 1965     2 Sheets-Sheet 1

March 26, 1968     S. A. STUBBLEFIELD     3,375,490
FLEXIBLE CABLELIKE TRANSDUCER
Filed Nov. 17, 1965     2 Sheets-Sheet 2
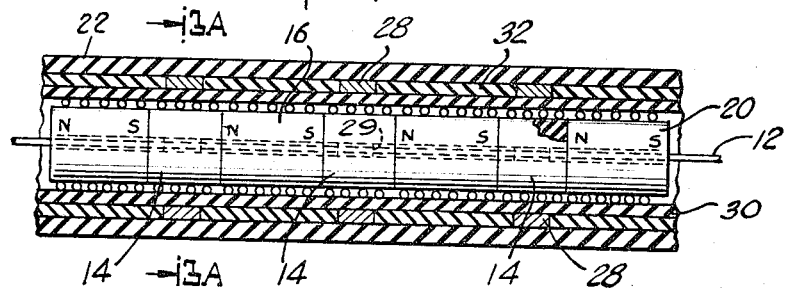
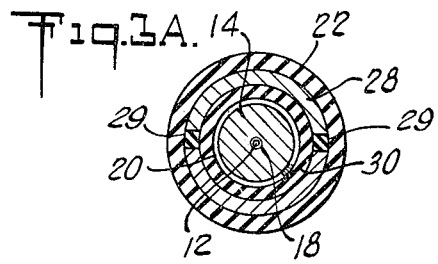
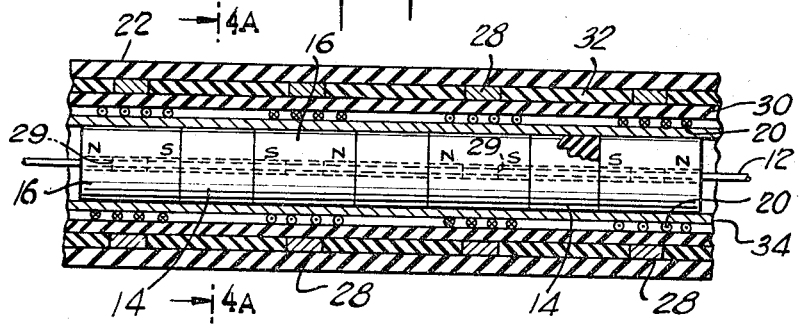
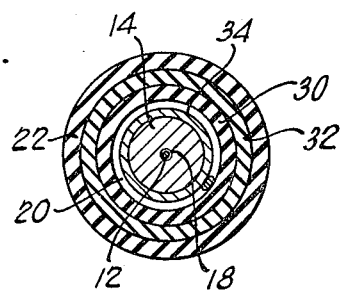

United States Patent Office 3,375,490
Patented Mar. 26, 1968

3,375,490
FLEXIBLE CABLELIKE TRANSDUCER
Steven A. Stubblefield and Robert L. Douglas, Houston, Tex., assignors to Texaco Inc., New York, N.Y., a corporation of Delaware
Filed Nov. 17, 1965, Ser. No. 508,296
10 Claims. (Cl. 340—17)

The invention relates to a flexible cablelike transducer for responding to seismic signals and more particularly to a flexible cablelike transducer for use in carrying out seismic exploration from water surface locations such as the ocean.

Seismic explorations of the earth below large bodies of water are generally carried out by a ship from which explosive charges or shots are detonated thus producing the seismic signals which penetrate the water and the underlying earth's surface. The seismis signals reflected from interfaces within the earth are intercepted by seismic transducers such as geophones, a number of which are strung out along a line extending from the ship. Considerable time is consumeds in handling the line with the number of geophones attached thereto. For example, it is necessary to string the line with the geophones attached thereto out behind the ship each time that seismic exploration is to be carried on and likewise considerable time is consumed in reeling in the line at the end of the exploration period.

Another problem encountered in the use of a number of geophones attached to a line is that geophones in passing through the water at any appreciable velocity set up a disturbance in the water which is very often picked up as interfering signals by adjacent geophones on the string. Accordingly, it is necessary in most seismic operations from the water surface to stop the ship during shooting so that the water disturbance can be eliminated. However, this introduces a drift problem of the string of geophones with respect to the ship unless some small headway of the ship is maintained.

The above disadvantages are overcome by providing a seismic transducer in the form of a flexible cable.

It is another object of the present invention to provide a string of geophones which can be more easily handled and thus provide a saving in time.

It is a further object of the present invention to provide a transducer in the form of a flexible cable which is smooth about its outer surface thereby reducing disturbances when moving through the water.

It is a further object of the present invention to provide a flexible cablelike transducer which consists of a few simple parts which can be easily assembled.

These and other objects and advantages of the invention are achieved by providing a flexible cable-like transducer for responding to seismic signals which comprises a flexible central stress member having permanent magnets and resilient spacers strung alternately on the central stress member. A continuous electrical conducting means is located in the flux field of the permanent magnets at substantially right angles to the lines of flux and forms a coil about said cablelike transducer. Means are provided which produce relative motion between the lines of flux and the electrical conducting means in response to a seismic signal thereby cutting flux lines of force and inducing a voltage in the winding indicative of the seismic signal.

The above-mentioned and other features and objects of this invention and the manner of obtaining them will become more apparent and the invention itself will be best understood, by reference to the following description of several embodiments of the invention taken in conjunction with the accompanying drawings, wherein:

FIG. 3 is a vertical cross sectional side view of a further embodiment of a section of the flexible cablelike transducer.

FIG. 3A is a transverse cross sectional view taken along the line 3A—3A of the section of cable of FIG. 3.

FIG. 4 is a vertical cross sectional side view of yet another embodiment of a section of the flexible cable-like transducer of this invention.

FIG. 4A is a transverse cross sectional view taken along the line 4A—4A of the section of cable of FIG. 4.

Figure 1:
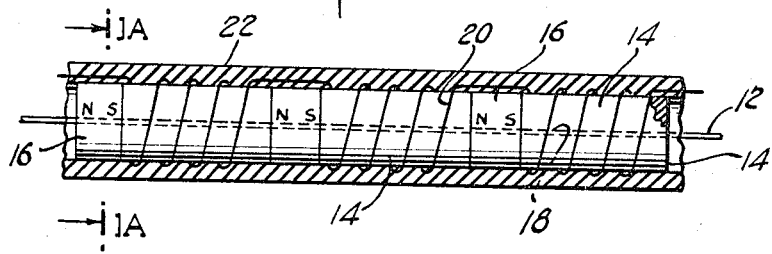
FIG. 1 is a vertical partial cross sectional side view of a section of the flexible cable-like transducer.
Figure 1A:
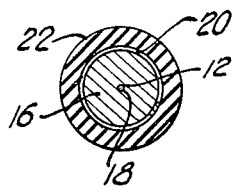
FIG. 1A is a transverse cross sectional view taken along the line 1A—1A of the cable of FIG. 1.

As can be seen from FIG. 1, the invention consists of a number of transducer elements strung together to form a cable. The cable comprises a central stress member 12 which consists of a small diameter cable such as stainless steel, about which the cable transducer is formed. Resilient flexible spacer elements 14 and permanent magnets 16 are alternately strung on the central cable 12. The assembly or stringing is facilitated by a hole 18 which extends through the center of each of the resilient spacers and permanent magnets. The spacers and the permanent magnets are cylindrically shaped and are of approximately the same diameter. However, it is not necessary that these elements be of the same diameter, for example, the spacers could be of a slightly smaller diameter than the permanent magnet elements. The permanent magnets are arranged so that their polarities correspond and the flux field extends from the north pole of one magnet to the south pole of the next succeeding magnet. This flux field extends through the resilient spacer elements 14. Thus the magnetic circuit extends along the entire cable. A thin electrical conducting wire 20 is wound about each of the spacers 14 forming a coil. A number of such wires may be wound on the spacers thus forming a number of coils on each spacer. The thin wire conductor 20 is a continuous conductor, that is, the coil formed on each spacer is electrically connected preferably in series. The electrical conductor 20, the spacers 14 and the permanent magnets 16 are surrounded by a sheath 22 of resilient material, such as rubber, which serves as a receiving element and gives the transducer array a smooth cablelike finish as well as rendering the arrangement waterproof.

In operation, a seismic signal received by the cable causes compression of the resilient sheath 22 and the underlying conducting coil of wire 20 which surrounds the resilient spacers 14 thus changing the diameter of the coil and cutting the lines of flux which extend through the spacers from the north pole of one permanent magnet element 16 to the south pole of the next permanent magnet element. Accordingly, a voltage is induced in the electrical conductor 20 the amplitude of which is related to the number of flux lines cut by the changing diameter of the electrical conductor wire coil 20. It will be appreciated that the flexible resilient spacers also provide flexibility of the cable in conjunction with the resilient sheath therearound. In actual operation, that is, when the cable is strung out from the shooting vessel and the vessel is underway the cable will be essentially straight for best operations.

Figure 2:
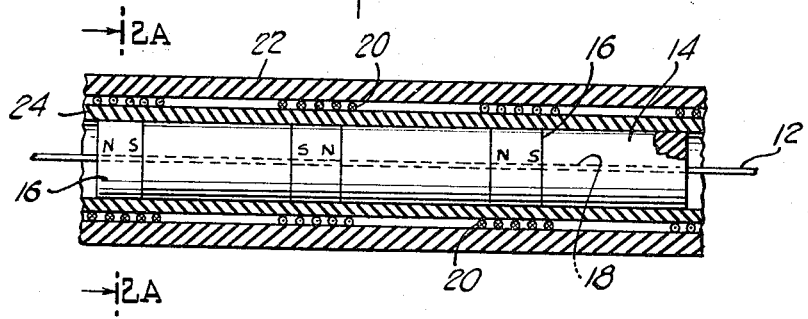
FIG. 2 is a vertical cross sectional side view of another embodiment of a section of the flexible cablelike transducer.
Figure 2A:
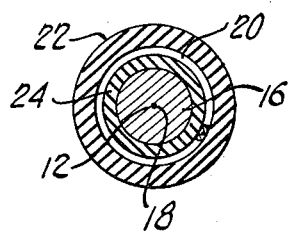
FIG. 2A is a transverse cross sectional view taken along the line 2A—2A of the section of cablelike transducer of FIG. 2.

The embodiment shown in FIG. 2 differs from the above described embodiment in that the polarities of the alternate permanent magnets 16 are reversed so that the magnetic flux field is not from the north pole of one magnetic element to the south pole of the next magnetic element but is from the north pole to the south pole of the same magnetic element. The result is that the magnetic circuit or flux field does not extend through the resilient be designated by the same reference numerals. Since the periphery of each magnetic element 16. The elements in FIG. 2 which correspond to those shown in FIG. 1 will be designated by the same reference numerals. Since the magnets 16 are alternately reversed in polarity with respect to one another along the length of the cable and the flux field is about the periphery, the continuous thin wire electrical conductor 20 is not wound about the resilient spacer 14 but is wound about a compressible member or sheath 24 which surrounds the spacers 14 and magnets 16. Since the alternate magnetic elements 16 are reversed in polarity the flux field extending about the periphery from the north pole to the south pole will be in opposite directions for adjacent magnetic elements. Accordingly, the winding 20 which surrounds the compressible sheath 24 is reversed around each one of the magnetic elements 11, that is, the direction of winding is alternately changed so that the induced voltage will be aiding. This is designated in FIG. 2 by depicting the wires going into and coming out of the drawing by x's and dots, respectively. The wire windings or coils 20 are surrounded by a sheath of resilient material 22 which, as in the embodiment of FIG. 1, serves as a seismic signal receiving element and a waterproofing as well as a smooth outer finish for the cable. Since the arrangement of the coils 20 and the polarities of the magnetic elements 16 are different from the FIG. 1 embodiment, the operation is also slightly altered. The coils 20 are still located in the magnetic fields, however, the magnetic fields or lines of flux have different locations. In operation, a seismic signal impinging on the sheath 22 causes a compression thereof and a corresponding compression of resilient sheath or member 24. The coils 20 located between sheath 22 and resilient member 24 are also constrained to move in and out radially thus cutting lines of flux which extend about the periphery of the magnetic elements 16 and thereby induces a voltage in the windings which is indicative of the seismic signal detected.

The embodiment shown in FIG. 3 is somewhat similar to the FIG. 1 embodiment in that the permanent magnets 16 are arranged to have the same polarity. However, in addition to the flux path from the north pole to the south pole of adjacent magnetic elements 16, there is a further element introduced which affects the flux path. The elements corresponding to those depicted in the prior figures will be designated by the same reference numerals in FIG. 3. As can be seen, the electrical winding 20 in FIG. 3 is a continuous winding which extends about the alternate spacers 14 and magnets 16 in one continuous coil. The winding 20 is surrounded by a resilient member or sheath 30. The resilient sheath 30 is surrounded by half cylinders 28 of magnetically soft material. These half cylinders 28, when placed about the compressible sheath 30, provide gaps 29 between the longitudinal ends thereof of which gaps are diametrically opposed to one another (see FIG. 3A). These magnetically soft half cylinders 28 can be surrounded by a sheath of resilient material 22 similar to that depicted in the embodiments of FIG. 1 and FIG. 2. It should be also noted that the half cylinder members 28 of magnetically soft material consist of relatively short lengths, each of which is separated from the other by resilient material 32 providing a place at which the half cylinder members 28 can bend with respect to each other so that the cable is still flexible. A characteristic of magnetically soft material is that it offers very little resistance to flux flow. Thus, the fringe flux between the north pole of one permanent magnet element 16 and the south pole of the next permanent magnet element utilizes the adjacent soft magnetic half cylinders 28 as part of its path.

In operation, an impinging seismic wave will cause the effected half cylindrical element or elements to compress in diameter thus causing sheath 30 around which it is placed to correspondingly compress so that there is a change of the flux distribution. Actually, with movement of the half cylinder 28 radially inward more of the flux between the north pole of one magnet and the south pole of the next magnet will pass through the half cylinder 28. This change in the flux will be detected by the winding of thin wire 20 surrounding the resilient spacers 14 and magnets 16. Accordingly, a voltage will be induced in the winding 20 which is indicative of the impinging seismic signal.

The embodiment depicted in FIG. 4 differs from the embodiment shown in FIG. 3 mainly in that the polarities of the alternate magnetic elements 16 are reversed. Thus, as was the case in the embodiment of FIG. 2, the flux path is from the north pole to the south pole around the periphery of each magnetic element 16. A sheath of material 34 is located about the magnets 16 and spacers 14 of this embodiment. This sheath 34 serves as a spacer between the winding 20 and the permanent magnetic elements 16. Since alternate magnetic elements have reversed polarity or reversed pole positions, the flux field is alternately in the opposite direction about the periphery of alternate magnetic elements 16.

As in the embodiment of FIG. 3, the winding 20 is surrounded by a sheath of resilient material 30, which sheath is surrounded by half cylinders 28 of magnetically soft material. Thus, the flux field is from the north pole around the periphery of the magnetic element 16 and through an adjacent half cylinder 28 of magnetically soft material and back to the south pole of the same magnetic element. This path takes the lines of flux across the windings 26 of the coil which surrounds the magnetic elements 16. It will be appreciated that an impinging seismic signal will cause the half cylinders 28 of magnetically soft material to move radially inward thus changing the flux distribution which change will be noted by the coils surrounding the magnetic element. In other words, there will be a change in the number of lines of flux cut by the winding which will induce a voltage in the winding which is indicative of the impinging seismic signal. As was mentioned in connection with the embodiment discussed with respect to FIG. 3, the half cylinders of magnetically soft material have gaps 29 between the longitudinal edges thereof. These gaps can be filled with a resilient material for water proofing purposes. These magnetically soft material half cylinders 28 are of relatively short length and are separated by resilient material 32 such that the cable maintains its flexibility.

In summary, the operation of the flexible cable-like transducer is dependent on the wire winding 20 detecting a change in the flux field by either the coil formed by the winding changing dimension, in this case diameter, so that the coil windings cut across a number of flux lines or the flux lines cut across the fixed coil windings thereby, in both cases, inducing a voltage in the winding dependent on the number of flux lines cut. Thus, the result is the same in both cases in that a voltage is induced in the winding which is indicative of the seismic signal causing the relative movement between the flux lines and coil windings.

Obviously, many modifications and variations of the invention as hereinabove set forth, may be made without departing from the spirit and scope thereof, and therefore, only such limitations should be imposed as are indicated in the appended claims.

We claim:

1. A flexible elongated cablelike transducer of substantially uniform outer circumference along its length for responding to seismic signals comprising, a flexible central stress member, permanent bi-polar magnetic elements and resilient spacers strung alternately on said central stress member, a continuous electrical conducting means passing through the magnetic field of each of said permanent magnets at substantially right angles thereto and forming a coil about said magnetic elements and spacers, seismic signal responsive means for providing relative motion between said magnetic field and said electrical conducting means passing therethrough in response to a seismic signal thereby inducing a voltage in said winding indicative of said seismic signal, and a resilient outer sheath surrounding said central stress member, magnetic elements, resilient spacers, and electrical conducting means, said outer sheath extending along the entire length of said cablelike transducer.

2. A flexible cablelike transducer according to claim 1, wherein said permanent bi-polar magnetic elements have the same polarity with respect to one another so that facing poles of adjacent elements are of unlike polarity, whereby the flux field extends from the north pole to the south pole of adjacent elements whereby a seismic signal causes a change in diameter of said resilient sheath and accordingly a change in diameter of the electrical conducting coil where it surrounds the resilient spacers thereby cutting magnetic flux lines and inducing a voltage in said winding indicative of said seismic signal.

3. A flexible cablelike transducer according to claim 1, wherein said permanent bi-polar magnetic elements are alternately oppositely poled so that facing poles of adjacent elements are of like polarity, whereby the magnetic field extends from the north pole to the south pole of the same element about the periphery thereof, a resilient inner sheath surrounding said magnetic elements and resilient spacers, said continuous electrical conducting means being wound about said resilient inner sheath in the form of a coil, said relative movement of said electrical conducting means and said magnetic field being provided by compression of said electrical conducting means coil in diameter in response to said seismic signal responsive means.

4. A flexible cablelike transducer according to claim 1, wherein an inner sheath of resilient material surrounds said coil of continuous electrical conducting means, said seismic signal responsive means comprising semi-cylindrical sections of magnetically soft material surrounding said inner sheath of resilient material, said semi-cylindrical sections surrounding said inner sheath of resilient material being located diametrically opposite one another about said inner sheath.

5. A flexible cablelike transducer according to claim 4, wherein said diametrically opposite semi-cylindrical sections of magnetically soft material have the longitudinal edges thereof separated by gaps whereby said sections can converge diametrically about said cablelike transducer.

6. A flexible cablelike transducer for responding to seismic signals comprising, a flexible central stress member, permanent bi-polar magnetic elements and resilient spacers strung alternately on said central stress member, said permanent bi-polar magnetic elements being alternately oppositely poled so that the magnetic flux field is from north pole to south pole about the periphery of each magnetic element, a spacer member surrounding said magnetic elements and spacers and being concentric therewith, a continuous electrical conducting means wound on said spacer member forming a coil thereabout, a resilient sheath member surrounding said coil formed of said continuous electrical conductor, semi-cylindrical sections of magnetically soft material surrounding said resilient sheath member and being concentric therewith, said semi-cylindrical sections being separated along their longitudinal edges by diametrically opposite gaps thereby allowing said semi-cylindrical sections to converge diametrically in response to received seismic signals, each of said semi-cylindrical sections being separated from adjacent semi-cylindrical sections lengthwise of the cable by resilient means affording a joint therebetween, the convergence of said semi-cylindrical sections diametrically providing a change in the flux field intercepted by said continuous electrical conducting means thereby inducing a voltage therein indicative of said received seismic signal.

7. A flexible cablelike transducer for responding to seismic signals comprising, a flexible central stress member, permanent bi-polar magnetic elements and resilient spacers strung alternately on said central stress member, a continuous electrical conducting means passing through the magnetic field of each of said permanent magnets at substantially right angles thereto and forming a coil about said magnetic elements and spacers, seismic signal responsive means for providing relative motion between said magnetic field and said electrical conducting means passing therethrough in response to a seismic signal thereby inducing a voltage in said winding indicative of said seismic signal, wherein a sheath of resilient material surrounds said coil of continuous electrical conducting means, said seismic signal responsive means comprising semi-cylindrical sections of magnetically soft material surrounding said sheath of resilient material, said semi-cylindrical sections surrounding said sheath of resilient material being located diametrically opposite one another about said sheath, wherein said diametrically opposite semi-cylindrical sections of magnetically soft material have the longitudinal edges thereof separated by gaps whereby said sections can converge diametrically about said cablelike transducer, and wherein a plurality of semi-cylindrical sections of magnetically soft material are provided each separated from the adjacent semi-cylindrical element along the length of the cable by a joint of resilient material.

8. A flexible cablelike transducer according to claim 7 wherein said semi-cylindrical sections of magnetically soft material about said cable are surrounded by a sheath of resilient material, whereby the outer surface of said cablelike transducer is rendered smooth and said cable is made waterproof.

9. A flexible cablelike transducer according to claim 7, wherein said permanent bi-polar magnetic elements strung on said flexible central stress member have their polarities alternately reversed so that facing poles of adjacent elements are of like polarity, whereby the lines of flux extend about the periphery of each magnetic element from the north to the south pole of the same element, successive sections of said electrical conducting means forming said coil being alternately reversed in winding direction about the successive alternately reversed permanent bi-polar magnetic elements, whereby voltages induced in the conducting means by changes in flux across the successive sections of said conducting means due to the diametrical movement of said semi-cylindrical sections in response to a seismic signal will be in an aiding direction.

10. A flexible cablelike transducer according to claim 7, wherein said permanent bi-polar magnetic elements strung on said flexible central stress member have the same polarity so that facing poles of adjacent elements are of unlike polarity whereby the lines of flux extend from facing north to south poles of adjacent magnet elements, said continuous electrical conducting means having a voltage induced therein proportional to the change in magnetic flux lines provided by diametrical movement of said semi-cylindrical sections in response to a received seismic signal.

References Cited

UNITED STATES PATENTS

| | | | |
|---|---|---|---|
| 2,807,793 | 9/1957 | Bayhi | 340—7 |
| 2,864,073 | 12/1958 | Harris | 340—17 |
| 2,906,995 | 12/1959 | Chernosky | 340—17 |
| 3,100,292 | 8/1963 | Warner et al. | 340—17 |

SAMUEL FEINBERG, *Primary Examiner.*

BENJAMIN A. BORCHELT, SAMUEL W. ENGLE,
*Examiners.*

P. A. SHANLEY, R. M. SKOLNIK, *Assistant Examiners.*

UNITED STATES PATENT OFFICE

CERTIFICATE OF CORRECTION

Patent No. 3,375,490                                               March 26, 1968

Steven A. Stubblefield et al.

It is certified that error appears in the above identified patent and that said Letters Patent are hereby corrected as shown below:

Column 1, line 22, "consumeds" should read -- consumed --. Column 2, line 72, "magnents" should read -- magnets --. Column 3, line 5, after "resilient" insert -- spacers 14 between the magnets 16 but extends about the periphery of each magnetic element 16. The elements in FIG. 2 which correspond to those shown in FIG. 1 will --. Column 3, line 62, after "thereof" cancel "of".

Signed and sealed this 7th day of October 1969.

(SEAL)
Attest:

Edward M. Fletcher, Jr.                          WILLIAM E. SCHUYLER, JR.
Attesting Officer                                         Commissioner of Patents